(12) United States Patent
Hirukawa et al.

(10) Patent No.: US 8,312,949 B2
(45) Date of Patent: Nov. 20, 2012

(54) COOLING SYSTEM INCLUDING DUAL AIR ROUTING ZONES

(75) Inventors: Masayuki Hirukawa, Saitama (JP); Taeko Togawa, Saitama (JP); Takayoshi Tsujinaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 12/887,703

(22) Filed: Sep. 22, 2010

(65) Prior Publication Data

US 2011/0073288 A1 Mar. 31, 2011

(30) Foreign Application Priority Data

Sep. 30, 2009 (JP) ................................. 2009-226046

(51) Int. Cl.
*F28F 13/12* (2006.01)
(52) U.S. Cl. ...................................... 180/68.1; 180/68.6
(58) Field of Classification Search ................. 180/68.1, 180/68.2, 68.4, 68.6
See application file for complete search history.

(56) References Cited

U.S. PATENT DOCUMENTS

| | | | | |
|---|---|---|---|---|
| 5,046,550 A * | 9/1991 | Boll et al. | ........................ | 165/41 |
| 5,269,367 A * | 12/1993 | Susa et al. | ........................ | 165/41 |
| 6,106,228 A * | 8/2000 | Bartlett | ........................ | 415/146 |
| 6,832,644 B2 * | 12/2004 | Stauder et al. | ................... | 165/41 |
| 7,418,994 B2 * | 9/2008 | Evans et al. | ...................... | 165/41 |
| 7,603,968 B2 * | 10/2009 | Pantow | ....................... | 123/41.04 |
| 7,730,734 B2 * | 6/2010 | Hoshi et al. | ...................... | 62/244 |
| 7,992,664 B2 * | 8/2011 | Kiener et al. | ................. | 180/68.1 |
| 2003/0019606 A1 * | 1/2003 | Stauder et al. | ................... | 165/41 |
| 2007/0119395 A1 * | 5/2007 | Nagano et al. | .............. | 123/41.65 |
| 2007/0240431 A1 * | 10/2007 | Hoshi et al. | ........................ | 62/61 |
| 2008/0017138 A1 * | 1/2008 | Rogg | .......................... | 123/41.05 |
| 2008/0072851 A1 * | 3/2008 | McLennan | ................. | 123/41.49 |

FOREIGN PATENT DOCUMENTS

JP 1-162032 U 11/1989

* cited by examiner

*Primary Examiner* — John Walters
*Assistant Examiner* — Brian Swenson
(74) *Attorney, Agent, or Firm* — Carrier Blackman & Associates, P.C.; Joseph P. Carrier; William D. Blackman

(57) ABSTRACT

In a vehicle in which a front end of a hood is formed so as to extend forward from an upper portion of radiator in side view, and to be partly vertically aligned and overlapped with cooling fins of the radiator, in a first area of the radiator where the hood and the cooling fins are vertically aligned and overlapped with each other, the cooling fins are covered with a fan shroud from behind, and in a second area of the radiator where an air-intake port allows traveling wind to pass therethrough during movement of the vehicle, the cooling fins are not covered with the fan shroud, but are exposed to such traveling wind. Such arrangement of the cooling system achieves satisfactory cooling of the vehicle even in a situation in which an air-intake port, for introducing air into the radiator, must be made small.

20 Claims, 8 Drawing Sheets

COOLING SYSTEM INCLUDING DUAL AIR ROUTING ZONES

CROSS-REFERENCE TO RELATED APPLICATIONS

The present invention claims priority under 35 USC 119 based on Japanese patent application No. 2009-226046, filed on Sep. 30, 2009. The entire subject matter of this priority document, including specification claims and drawings thereof, is incorporated by reference herein.

BACKGROUND OF THE INVENTION

1. Field of the Invention

The present invention relates to a cooling system having a radiator and the like included therein in a vehicle.

2. Description of the Background Art

There is a known structure in which a fan shroud is provided for surrounding a cooling fan behind a radiator. In this known design, as exemplified in Japanese published patent document JP-UM-A-1-162032, the fan shroud also covers the radiator. More specifically, in an area outside of the fan, the fan shroud of this reference entirely covers cooling fins of the radiator from the rear thereof.

In addition, an air-intake port (grill), provided for introducing a traveling wind in a vehicle, is generally arranged in front of the radiator. When considering the cooling property, in general terms, the larger the size of the air-intake port, the better.

However, in the case of relatively small vehicles (for example, off-road type small vehicles which are mainly intended to travel on rough terrains and are called Multipurpose Utility Vehicle (MUV), there is a limit to the size of the air-intake port with respect to the required capacity of the radiator, and as a result, flexibility of layout of the air-intake port is currently low. Therefore, the air-intake port, which is originally limited in size, may need to be further substantially downsized, depending on the layout of other components, and a sufficient size of the air-intake port for achieving sufficient cooling effect might not be secured. To be more specific, there is a case where an edge portion of a hood, arranged above the radiator, covers the front of the radiator, and hence the air-intake port must be reduced in size, whereby the surface area of the air-intake port is reduced by a corresponding amount.

In the structure according to Japanese published patent document JP-UM-A-1-162032, described above, there is a problem that the fan shroud entirely covers the radiator, and hence smooth passage of the travel wind is impaired when the fan is stopped, during travel or the like. When the structure as described above is employed in a vehicle having a small air-intake port with reduced cooling effect as described above, there arises a problem of further inhibiting the cooling effect. In other words, the problem of reduced cooling effect arises because smooth passage of the traveling wind is impaired by the fan shroud, in addition to being incapable of introducing sufficient airflow from the small air-intake port.

In view of such circumstances, it is an object of the present invention to provide a vehicular cooling system which is capable of cooling a radiator, more specifically, of satisfactorily passing air over cooling fins of the radiator, even in a vehicle in which an air-intake port, for introducing air into the radiator, must be made small.

SUMMARY OF THE INVENTION

In order to achieve the above objects, the present invention according to a first aspect thereof provides a cooling system in a vehicle including: a hood (for example, a hood 22 in the embodiment) configured to cover above a front portion of the vehicle (for example, a vehicle 1 in the embodiment); a radiator (for example, a radiator 25 in the embodiment) arranged below the hood; an air-intake port (for example, a grill 23 in the embodiment) arranged below a front portion of the hood and configured to introduce cooling wind into cooling fins (for example, cooling fins 35 in the embodiment) of the radiator; a cooling fan (for example, a cooling fan 26 in the embodiment) arranged behind the radiator and drawing the wind for cooling the cooling fins of the radiator; and a fan shroud (for example, a fan shroud body 56 in the embodiment) extending from behind the cooling fins to the cooling fan and defining an air-intake channel for the wind drawn by the cooling fan, wherein a front end of the hood is formed to extend forward from an upper portion of the radiator in side view and partly be overlapped with the cooling fins of the radiator in front view, and the fan shroud is attached in a state of covering at least part of the cooling fins in an area where the hood and the cooling fins are vertically aligned and overlapped, and exposing part of the cooling fins.

The present invention according to a second aspect thereof is characterized in that the fan shroud has the cooling fan mounted at substantially the center thereof and is attached so as to cover upper sides and expose lower sides of the cooling fins formed into a square shape.

The present invention according to a third aspect thereof is characterized in that the fan shroud has a substantially rectangular shape in front view, includes an inner wall surface (for example, inner wall surfaces 59A, 60A, 61A, 62A in the embodiment) of a substantially arcuate shape broadened gradually toward the front of the vehicle, and is formed to open toward the front of the vehicle, and a corner (for example, corners 63 ... in the embodiment) of a substantially rectangular shape of the fan shroud is formed into a curved shape, and the cooling fins are exposed partly from the corner of the fan shroud.

The present invention according to a fourth aspect thereof is characterized by further including a radiator shroud (for example, a lower radiator shroud panel 41 and side radiator shroud panels 44, 45 in the embodiment) extending forward from both side portions and a lower portion of the radiator, and an air-blocking panel (for example, an air-blocking panel 72 in the embodiment) formed integrally with the fan shroud and configured to close a clearance between the upper portion of the radiator and the hood.

The present invention according to a fifth aspect thereof is characterized in that the fan shroud is provided with a fan shroud mounting portion (for example, upper fan shroud mounting portions 69, 69 in the embodiment) extending upward so as to straddle a radiator tank (for example, an upper tank 32 in the embodiment) of the radiator, and having a mounting portion (for example, upper fixing portions 71, 71 in the embodiment) with respect to the radiator set thereon, and the air-blocking panel is provided integrally with the fan shroud mounting portion.

The present invention according to a sixth aspect thereof is characterized in that the length of the air-blocking panel in the width direction is set to be equal to or larger than an outer diameter of the cooling fan.

The present invention according to a seventh aspect thereof is characterized in that the fan shroud covers the cooling fins in an area where the hood and the cooling fins are overlapped with each other in front view and the cooling fins include an exposed portion (for example, an exposed area R in the embodiment) which is not covered with the fan shroud in an area being overlapped with the air-intake port.

ADVANTAGES OF THE PRESENT INVENTION

According to the first and second aspects of the present invention, when the vehicle is traveling, the traveling wind introduced from the air-intake port passes smoothly through the cooling fins which are not covered with the fan shroud, and hence the cooling fins are effectively cooled. In contrast, when the vehicle is traveling at a low speed or stopped, the cooling fins in the area of being overlapped with the hood can be cooled intensively by driving the cooling fan and taking up the air toward the cooling fins in such area. Consequently, even in the case of the vehicle in which the size of the air-intake port cannot be secured sufficiently, the cooling fins are satisfactorily cooled irrespective of whether the vehicle is stopped or traveling.

According to the third aspect of the present invention, by eliminating an angular shape which tends to cause air retention in the fan shroud as the air-intake channel, the air retention in the fan shroud can be reduced.

According to the fourth aspect of the present invention, with the provision of the radiator shroud, the effect of collecting the traveling wind introduced into the radiator is enhanced, and lowering of the cooling efficiency due to the backflow of the air passed through the radiator to in front of the radiator is prevented by the air-blocking panel.

According to the fifth aspect of the present invention, the fan shroud mounting portion can be used as a supporting member for the hood, so that flection of the hood is prevented from affecting the radiator or, more specifically, the radiator tank (radiator cap, etc.).

According to the sixth aspect of the present invention, the backflow of the air passed through the radiator to in front of the radiator is reliably prevented.

According to the seventh aspect of the present invention, with the configuration in which the cooling fins in the area where the traveling wind from the air-intake port hits directly is exposed to achieve adequate aeration and the cooling fins in the area being overlapped with the hood, where the traveling wind does not hit directly, is cooled by collecting air using the fan shroud, enhancement of cooling efficiency is achieved.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. In addition, in the following description, three periods ( . . . ) used after a number signify that more than one of such numbered item is present in the described apparatus or assembly.

Figure 1:
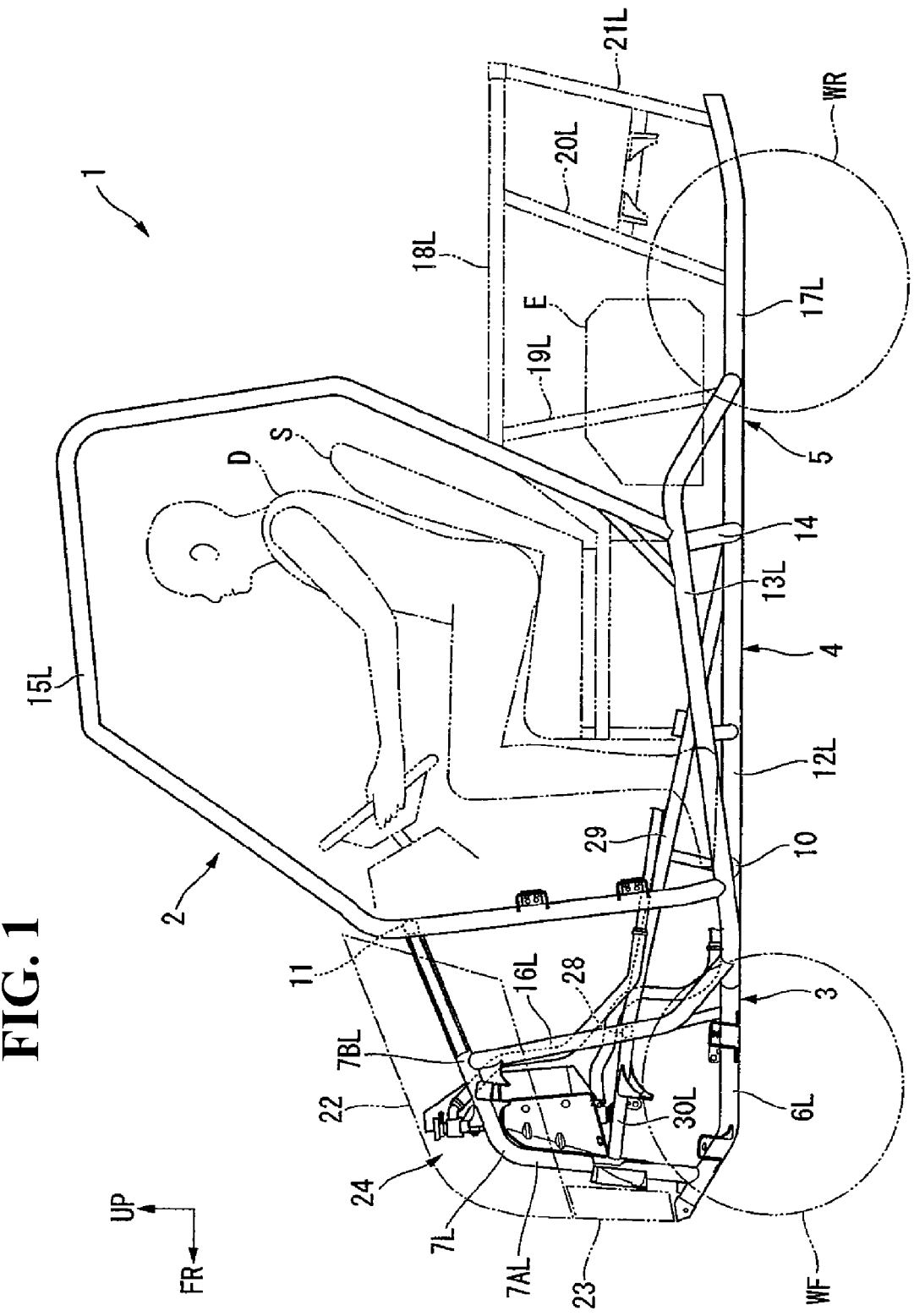
FIG. 1 is a side view of a vehicle according to a selected illustrative embodiment hereof.
Figure 2:
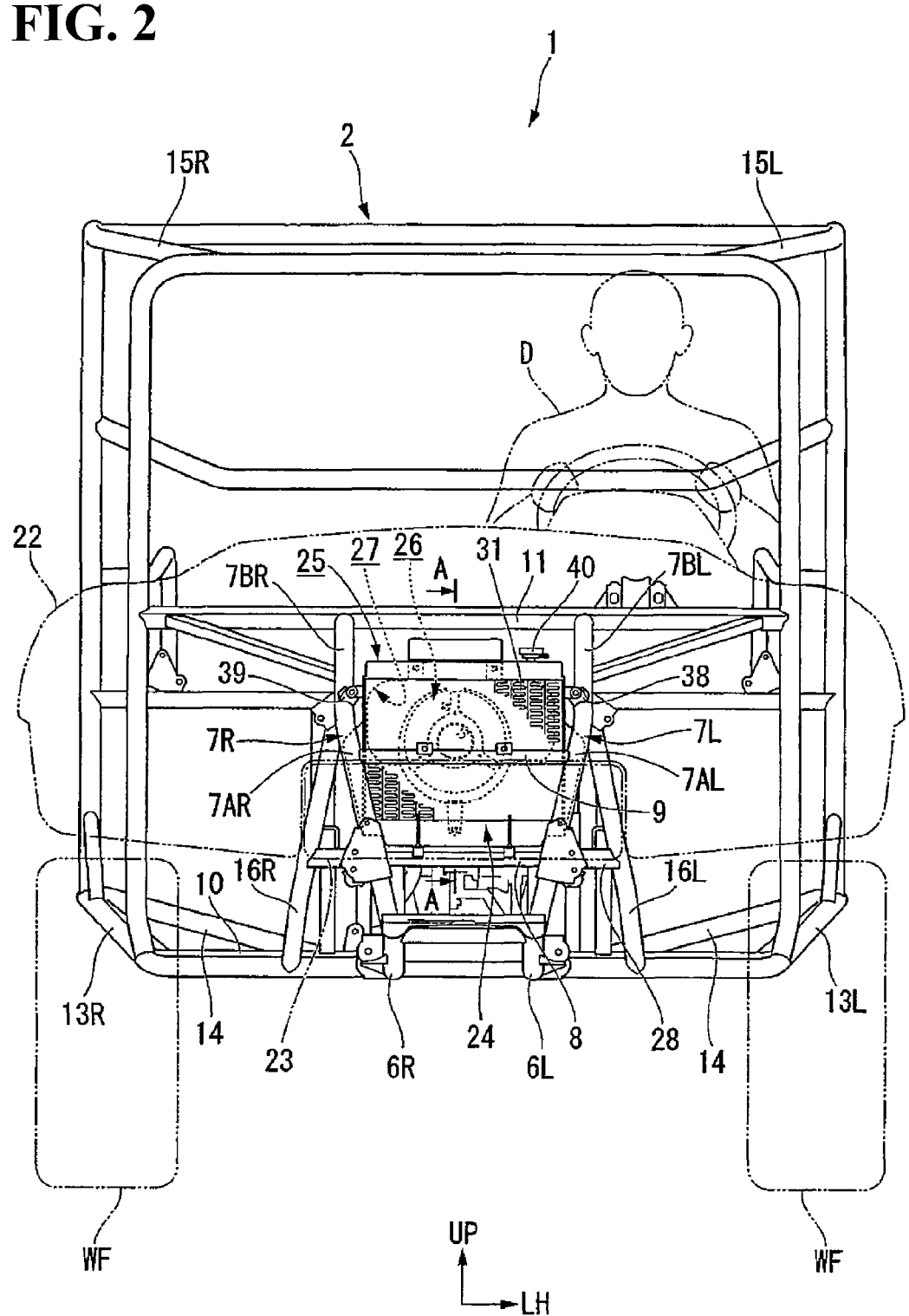
FIG. 2 is a front view of the vehicle according to the embodiment.

FIGS. 1 and 2 show a side view and a front view of a vehicle 1 having a cooling system structure according to the present invention. The vehicle 1 has a configuration of a relatively compact Multipurpose Utility Vehicle (MUV) intended mainly to travel off-road or on rough terrain. In the drawings used for description given below, arrows FR which indicate a forward direction of the vehicle, arrows LH which indicate a leftward direction of the vehicle, and arrows UP which indicate an upward direction of the vehicle are shown as appropriate. In the following description, these directions are used to illustrate, rather than to limit the invention.

The vehicle 1 includes a vehicle frame 2 of a basic framework of the vehicle. The vehicle frame 2 includes a front frame portion 3 configured to suspend front wheels WF, a center frame portion 4 provided behind the front frame portion 3 and configured to define a space in which a seat S or the like on which a driver D is seated is provided, and a rear frame portion 5 provided behind the center frame portion 4, configured to suspend rear wheels WR and having an engine E mounted thereon.

The front frame portion 3 includes a pair of left and right lower front frame sections 6L, 6R (only the lower front frame 6L on the near side of the plane of paper is shown in FIG. 1) extending in the fore-and-aft direction in the lower front portion of the vehicle, and a pair of left and right upper front frame sections 7L, 7R (only the upper front frame 7L on the near side of the plane of paper is shown in FIG. 1) rising upward from front end portions of the lower front frame sections 6L, 6R, curving, and then extending upward and rearward.

The upper front frame sections 7L, 7R include upward rising portions 7AL, 7AR rising upward (only the upward rising portion 7AL on the near side of the plane of paper is shown in FIG. 1) and inclined portions 7BL, 7BR (only the inclined portion 7BL on the near side of the plane of paper is shown in FIG. 1) being changed in degree of inclination from the upward rising portions 7AL, 7AR and extending behind the vehicle. Extending between the upward rising portions 7AL, 7AR is a first sub-cross frame 8 provided on the lower side and a second sub-cross frame 9 provided on the upper side.

The center frame portion 4 includes a first lower cross frame 10 being connected to rear ends of the lower front frame sections 6L, 6R and extending in the vehicle width direction in the lower portion of the vehicle, and an upper cross frame 11 connected to rear ends of the upper front frame sections 7L, 7R and extending in the vehicle width direction.

Referring to FIG. 1, the center frame portion 4 further includes a pair of left and right center lower frame sections 12L, 12R (only the center lower frame 12L on the near side of the plane of paper is shown in FIG. 1) extending rearward from a substantially central area of the first lower cross frame 10, a pair of left and right side frame sections 13L, 13R connected to both end portions of the first lower cross frame 10 and extending rearward and gently upward (only the side frame 13L on the near side of the plane of paper is shown in FIG. 1), a second lower cross frame 14 connected to rear ends of the center lower frame sections 12L, 12R formed so as to extend in the vehicle width direction and connected at both end portions thereof to the side frame sections 13L, 13R, and a pair of left and right roll bars 15L, 15R rising from front portions and rear portions of the side frame sections 13L, 13R (only the roll bar 15L on the near side of the plane of paper is shown in FIG. 1).

The upper cross frame 11 is extended between the roll bars 15L, 15R in the substantially central area of the front portion thereof. The roll bars 15L, 15R are members for defining a space for disposing the seat S or the like, and are each formed into a substantially U-shape in side view of the vehicle. As shown in FIG. 2, the front portions of the side frame sections 13L, 13R are bent inward in the vehicle width direction and the front ends thereof are connected to the side portions of the lower front frame sections 6L, 6R.

One end of each of front upright frame sections 16L, 16R (only the front upright frame 16L on the near side of the plane of paper is shown in FIG. 1) which rise upright is connected to the front bent portion of each of the side frame sections 13L, 13R, and the other end of each of the front upright frame sections 16L, 16R is connected to each of the upper front frame sections 7L, 7R. As shown in FIG. 2, a front cross pipe 28 extends between the front upright frame sections 16L, 16R, and front sub pipes 30L, 30R (only the front sub pipe 30L on the near side of the plane of paper is shown in FIG. 1) extend between the front cross pipe 28 and the upper front frame sections 7L, 7R. Furthermore, as shown in FIG. 1, a center frame 29 extending in the fore-and-aft direction is provided between the front cross pipe 28 and the second lower cross frame 14 of the center frame portion 4.

The rear frame portion 5 includes a pair of left and right rear lower frame sections 17L, 17R (only the rear lower frame 17L on the near side of the plane of paper is shown) extending rearward from substantially central area of the second lower cross frame 14, and rear top frame sections 18L, 18R (only the rear top frame 18L on the near side of the plane of paper is shown) extending substantially parallel to the rear lower frame sections 17L, 17R above the rear lower frame sections 17L, 17R.

The rear frame portion 5 further includes first upright frame sections 19L, 19R (only the first upright frame 19L on the near side of the plane of paper is shown), second upright frame sections 20L, 20R (only the second upright frame 20L on the near side of the plane of paper is shown), and third upright frame sections 21L, 21R (only the third upright frame 21L on the near side of the plane of paper is shown) between the rear lower frame sections 17L, 17R and the rear top frame sections 18L, 18R.

The rear lower frame sections 17L, 17R are connected to the second lower cross frame 14 at front ends thereof, and are connected to rear ends of the side frame sections 13L, 13R at side portions of the substantially central areas thereof. Although not shown in the drawings, cross frame sections are provided so as to extend between the first upright frame sections 19L, 19R, the second upright frame sections 20L, 20R, and the third upright frame sections 21L, 21R respectively at positions considered to be needed.

The engine E is a rear-mounted water-cooled engine, which is mounted above the rear lower frame sections 17L, 17R in the rear frame portion 5. The engine E includes drive shafts projecting respectively from side walls of a front portion and a rear portion of a crankcase thereof, and is configured to transmit a rotary power to the front and rear wheels WF, WR via the respective drive shafts.

In the front portion of the vehicle, a hood 22 is arranged above the upper front frame sections 7L, 7R, and a grill 23, which serves as an air-intake port, is arranged in front of the upper front frame sections 7L, 7R. The hood 22 is supported by the upper front frame sections 7L, 7R, and by the roll bars 15L, 15R at appropriate positions, as needed. The hood 22 is inclined downwardly toward the front in side view along the inclined portions 7BL, 7BR of the upper front frame sections 7L, 7R, and has a sufficient width to cover the entire area between the upper front frame sections 7L, 7R, as shown in FIG. 2. The grill 23 is arranged below a front edge portion of the hood 22, and is disposed at a substantially central portion in the vehicle width direction.

Figure 3:
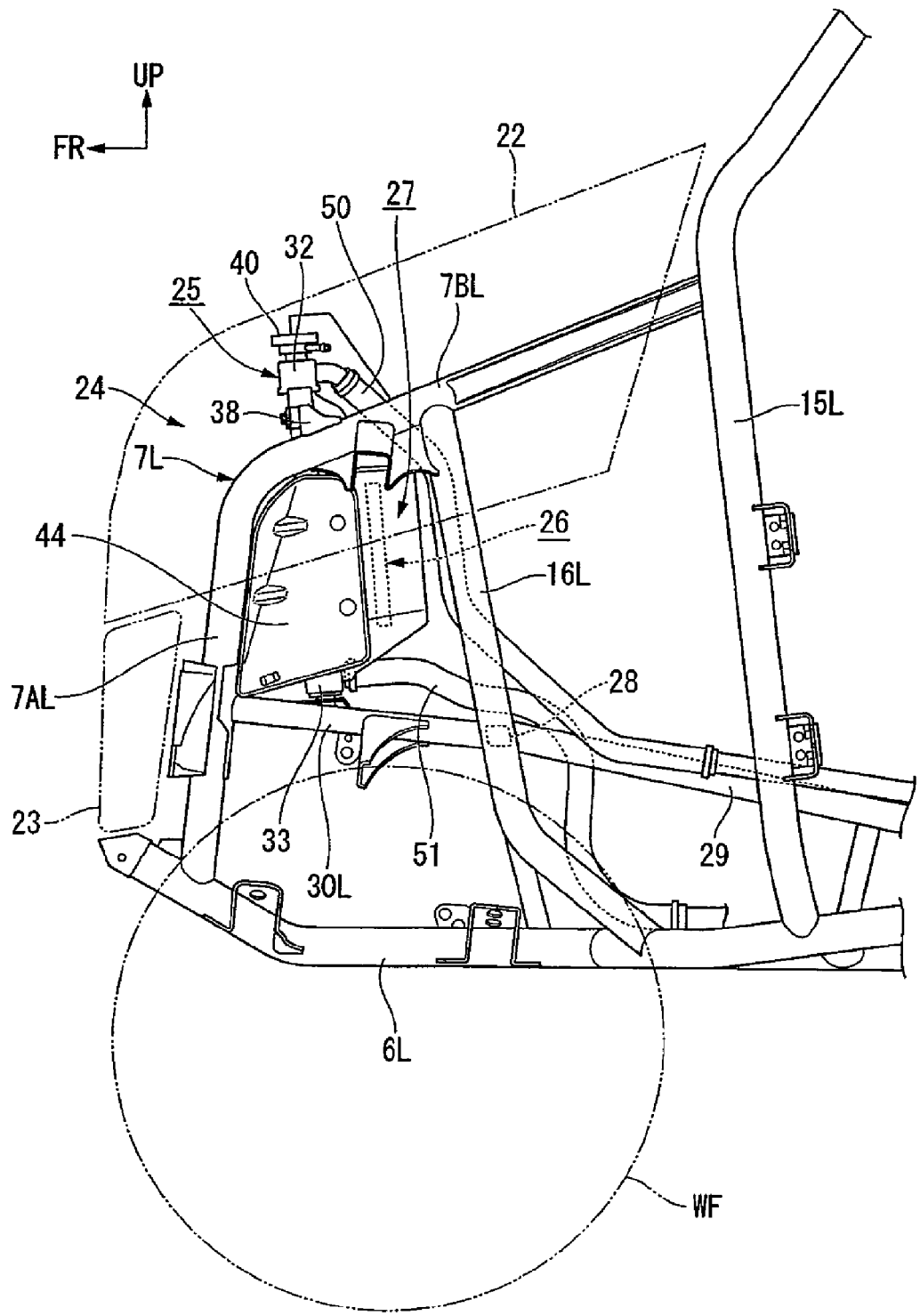
FIG. 3 is a side view of a front portion of the vehicle.

Referring to FIG. 3, a cooling system apparatus 24 is arranged below the hood 22 and behind the grill 23. The cooling system apparatus 24 includes a radiator 25, a cooling fan 26 arranged behind the radiator 25, and a fan shroud 27 interposed between the cooling fan 26 and the radiator 25.

Figure 4:
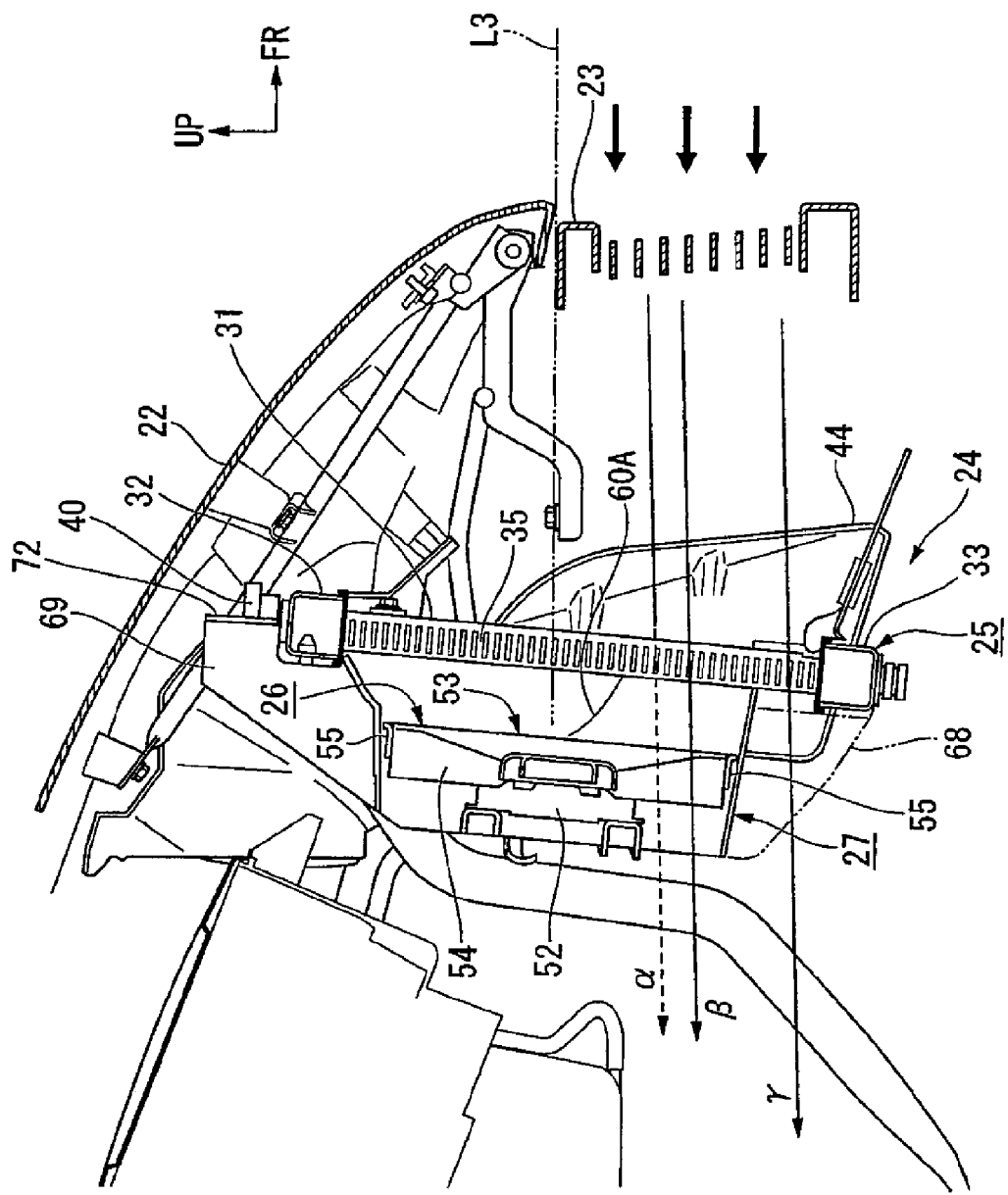
FIG. 4 is a vertical cross-sectional view of the front portion of the vehicle.

As shown in FIGS. 2 and 4, a front end of the hood 22 in the substantially central area thereof, in the vehicle width direction, extends from an upper portion to a lower portion thereof disposed in front of and below the upper portion of the radiator 25 in side view, and is formed so as to be overlapped partly with an upper portion of the cooling system apparatus 24, more specifically, with the upper portion of the radiator 25 positioned forward in the cooling system apparatus 24. In other words, the upper portion of the radiator 25 is covered by the hood 22 under normal operating conditions, with the hood closed. Referring also to FIGS. 5 to 8, the arrangement and the configuration of selected components of the cooling system apparatus 24 will be described in detail below.

Figure 5:
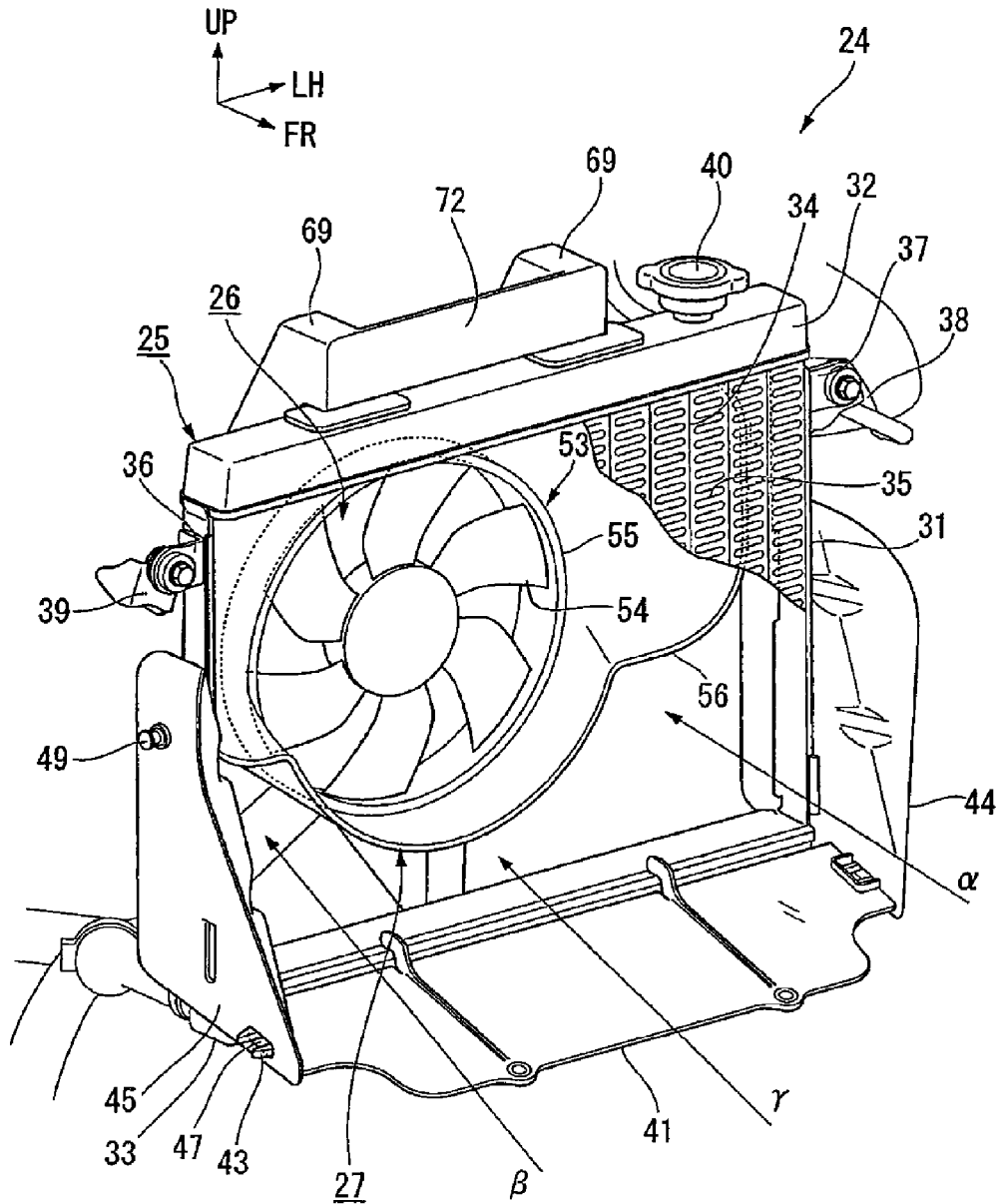
FIG. 5 is a perspective view of a cooling system apparatus provided in the vehicle.

Referring now to FIGS. 4 and 5, the radiator 25 of the cooling system apparatus 24 has a configuration of a down-flow type radiator, and includes a radiator core 31 having the shape of a rectangular (square) panel in front view, and an upper tank 32 and a lower tank 33 to be attached integrally to an upper portion and a lower portion of the radiator core 31.

The radiator core 31 has a configuration including water tubes 34 . . . , which communicate with both the upper tank 32 and the lower tank 33 and are arranged consecutively, and a plurality of wave-shaped cooling fins 35 . . . disposed between the adjacent water tubes 34 . . . . Brackets 36, 37 are provided on upper side portions of the radiator core 31. As shown in FIG. 2, the radiator 25 is fixed by tightening the brackets 36, 37 with brackets 38, 39 formed on the upper front frame sections 7L, 7R with bolts.

As noted above, the upper portion of the radiator 25 is covered by the hood 22 under normal circumstances. To be more precise, however, an upper area of the radiator core 31, more specifically, an upper areas of the water tubes 34 . . . and the cooling fins 35 . . . are overlapped with the front end of the hood 22 in side and front views, where the radiator 25 is fixed to the upper front frame sections 7L, 7R as shown in FIGS. 2 to 4. In FIG. 4, the water tubes 34 . . . and the cooling fins 35 . . . are shown only partly. However, they are disposed over the entire area of the rectangular radiator core 31, and have a rectangular (square) shape as a whole. The radiator core 31 here is inclined slightly from the vertical with the upper end portion thereof moved toward the grill 23, as shown in FIG. 4.

A radiator cap 40 is provided on a left side portion of the upper tank 32 so as to protrude therefrom. The radiator cap 40 is connected to a reservoir tank (not shown) via a hose, and allows a supply of cooling water to flow outwardly to the tank in conventional fashion.

Referring now to FIG. 5, a lower radiator shroud panel 41 is provided on the lower tank 33 extending forwardly and downwardly therefrom. The lower radiator shroud panel 41 is provided with a pair of engaging claw fittings 42, 43 protruding leftward and rightward on respective side portions thereof (only the engaging claw fitting 43 is shown on the near side of the plane of paper).

In addition, a pair of side radiator shroud panels 44, 45 are provided extending forwardly from the side portions of the radiator core 31, and these side shrouds have engaging holes 46, 47 formed in lower edge portions thereof which engage the engaging claw fittings 42, 43, respectively (only the engaging hole 47 on the near side of the plane of paper is shown). The side radiator shroud panels 44, 45, have a roughly triangular shape, and are fixed at upper portions thereof to the side portions of the radiator core 31 with screws 48, 49 (only the screw 49 on the near side of the plane of paper is shown). The lower radiator shroud panel 41 and the side radiator shroud panels 44, 45 cooperate to form a radiator shroud extending forwardly from the radiator.

As shown in FIG. 3, an upstream inlet hose 50 is connected to the left side of a rear surface of the upper tank 32, and a downstream outlet hose 51 is connected to the right side of a rear surface of the lower tank 33. The respective hoses 50, 51 extend rearwardly on the vehicle, and are connected to the engine E in the rear portion of the vehicle.

Referring again to FIGS. 4 and 5, the cooling fan 26 is arranged in back of the radiator core 31, at a substantially central portion thereof. The cooling fan 26 includes a fan motor 52 and a fan body 53, which is fixed to a rotating shaft of the fan motor 52. The fan motor 52 is formed in a flattened shape and includes the rotating shaft supporting the fan body 53 and extending in the fore-and-aft direction of the vehicle. The fan motor 52 also includes a fixing portion (not shown) with respect to the fan shroud 27 on a rear surface thereof, and the cooling fan 26 is fixed to the fan shroud 27 via the fixing portion.

The fan body 53 integrally includes a plurality of blades 54 . . . extending radially from the rotating shaft, and a cylindrical portion 55 which surrounds, and is affixed to outside edge portions of the blades 54. When the cooling fan 26, fixed to the fan shroud 27, drives the fan motor 52, the blades 54 . . . and the cylindrical portion 55 rotate integrally, and wind is drawn rearwardly through the fan body 53.

The fan shroud 27 extends from an area immediately behind the cooling fins 35 . . . of the radiator core 31 to the cooling fan 26, and defines an air-intake channel for the wind drawn by the cooling fan 26. Accordingly, the wind is drawn through the cooling fins 35 . . . of the radiator core 31, and then passes through the fan shroud 27.

Figure 6:
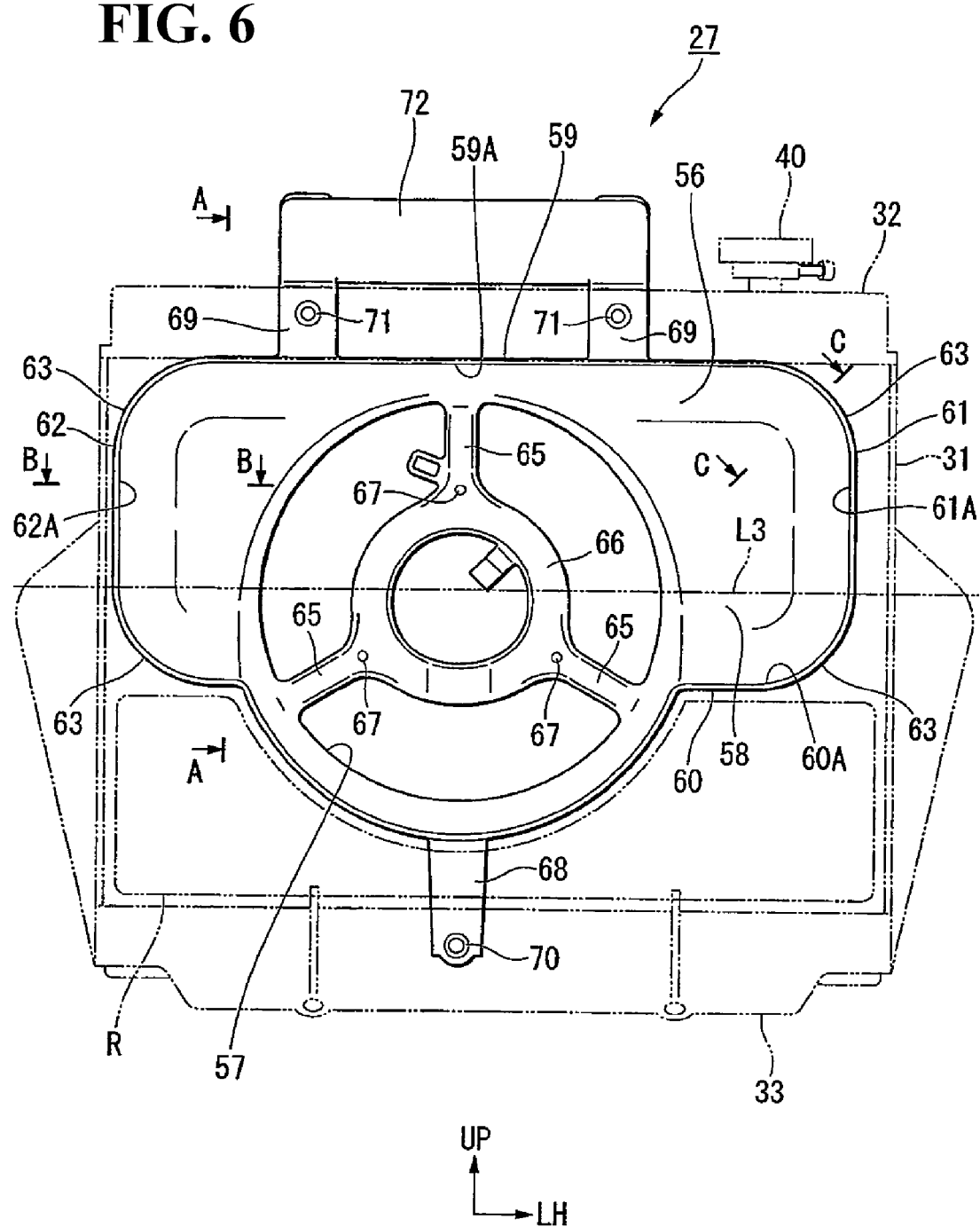
FIG. 6 is a front view of a fan shroud of the cooling system apparatus.
Figure 7:
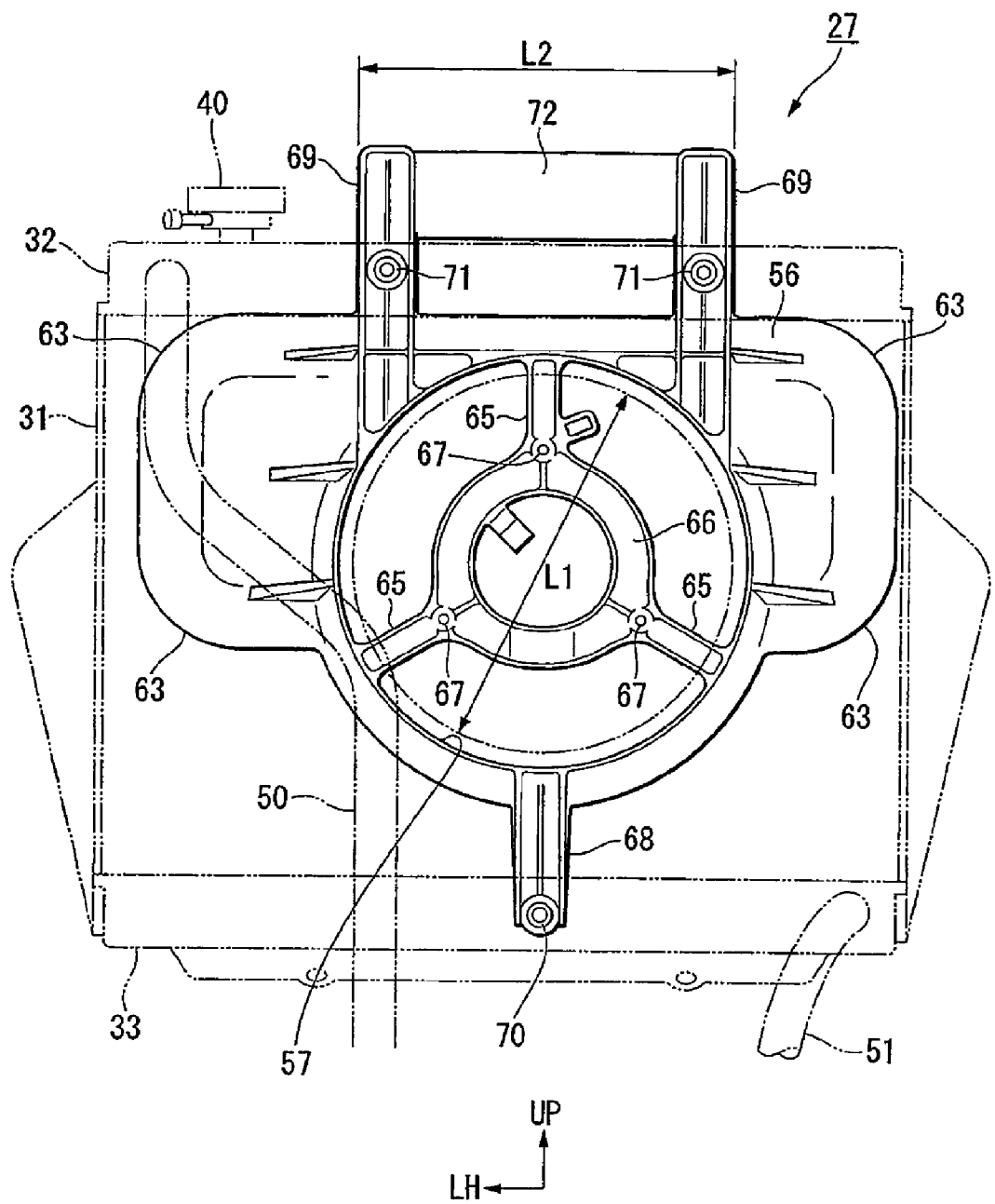
FIG. 7 is a back view of the fan shroud of the cooling system apparatus.

As shown in FIGS. 6 and 7, the fan shroud 27 is formed of, for example, a resin material, and includes a fan shroud body 56 having a modified rectangular shape in front view and back view. As shown also in FIG. 4, the fan shroud body 56 is formed with a cooling fan mounting portion 57 having a cylindrical shape and extending rearward at a substantially central portion thereof, as viewed from the side.

The fan shroud body 56 is formed substantially in a tray shape opened toward the front, and has a width slightly smaller than the width of the radiator core 31, and a height (excluding the fan mounting portion 57) set to be approximately half the height of the radiator core 31.

Figure 8A:
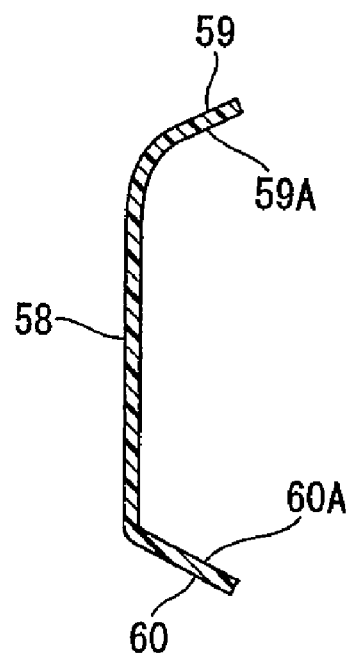
FIG. 8A is a cross-sectional view taken along the line A-A in FIG. 6.
Figure 8B:
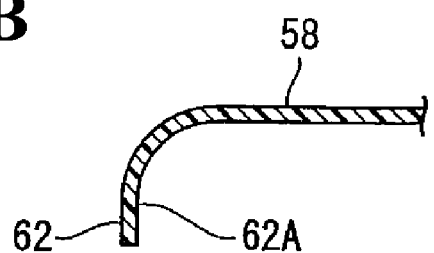
FIG. 8B is a cross-sectional view taken along the line B-B in FIG. 6.

Referring now to FIGS. 5-6 and 8(a)-8(b), an upper wall portion 59, a lower wall portion 60, a left wall portion 61, and a right wall portion 62 extending forward from a bottom portion 58 of the fan shroud body 56 have respective inner wall surfaces 59A, 60A, 61A, 62A which are formed into a substantially arcuate shape broadened gradually toward the front of the vehicle as shown in FIGS. 8(a) and (b). Although FIG. 8(b) shows a cross-section of the right wall portion 62, the left wall portion 61 is also formed into the same shape.

Figure 8C:
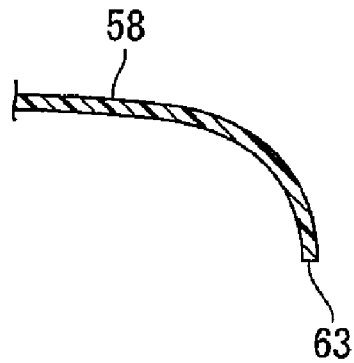
FIG. 8C is a cross-sectional view taken along the line C-C in FIG. 6.

As shown in FIG. 8(c), an inner wall surface of a joint portion between the upper wall portion 59 and the left wall portion 61 is also formed into a substantially arcuate shape broadened gradually toward the front of the vehicle. In addition, corners 63 . . . positioned at four corners of the fan shroud body 56 are rounded off and formed into a curved shape, as shown in FIGS. 6 and 7.

The cooling fan mounting portion 57 is configured and dimensioned to receive the fan body 53 therein, and has an inner diameter slightly larger than the cylindrical portion 55 of the fan body 53. A lower peripheral surface of the cooling fan mounting portion 57 protrudes downwardly from a lower portion of the fan shroud body 56, and the lower peripheral surface of the cooling fan mounting portion 57 continues integrally from the lower wall portion 60 of the fan shroud body 56, as shown in FIGS. 6-7.

A rear inner wall surface of the cooling fan mounting portion 57 is formed with three flattened ribs 65 . . . extending toward a center of the cooling fan mounting portion 57 at intervals of about 120 degrees, and the inner ends of the ribs 65 are integrally connected to an outer peripheral surface of a mounting panel 66, formed in a roughly circular shape.

The mounting panel 66 is positioned with a center thereof aligned with the center of the cooling fan mounting portion 57, and includes screw holes 67 . . . for the fixation of the fan motor 52 of the cooling fan 26 on a front surface thereof. As shown in FIG. 4, the fan motor 52 is fixed to the mounting panel 66 via the screw holes 67 . . . , and the wind drawn by the cooling fan 26 passes between the ribs 65 and flows rearwardly. Considering the arrangement of the grill 23, the rotating shaft of the cooling fan 26 attached to the cooling fan mounting portion 57 is also inclined downwardly toward the front.

The fan shroud 27 is formed integrally with a lower fan shroud mounting tab 68, extending downwardly from a lower portion of the cooling fan mounting portion 57, and is also formed integrally with a pair of upper fan shroud mounting portions 69, 69 at an upper portion of the cooling fan mounting portion 57 so as to extend upward therefrom.

The lower fan shroud mounting tab 68 is formed in a box-like shape opening toward the rear as shown in FIG. 7, and also extends forward toward the lower tank 33 as shown in FIGS. 4 and 6-7 (in FIG. 4, the lower fan shroud mounting tab 68 is shown by a double-dashed phantom chain line for the convenience of illustration).

The lower fan shroud mounting tab 68 is formed with a lower fixing portion 70 at a lower front end thereof for fixing the fan shroud 27 to the lower tank 33. The lower fixing portion 70 has a hole formed therethrough, and the lower fixing portion 70 is fixed to the lower tank 33 by inserting a clip or the like into the hole. Accordingly, the lower portion of the fan shroud 27 is fixed to the radiator 25.

The upper fan shroud mounting portions 69, 69 are each respectively formed in a box-like shape opening rearward as shown in FIG. 7, and extend upwardly from the top of the fan shroud body 56 at spaced-apart positions offset from the center of the cooling fan mounting portion 57 in the vehicle width direction. As shown in FIGS. 4-5, the upper fan shroud mounting portions 69, 69 also extend forward toward the upper radiator tank 32 as well. Here, the upper fan shroud mounting portions 69, 69 extend further upward so as to straddle the upper tank 32, and upper ends thereof are set to have a height reaching to a vicinity close to an inner surface of the hood 22.

The upper fan shroud mounting portions 69, 69 are formed with upper fixing portions 71, 71 at substantially central areas thereof in the vertical direction, and these upper fixing portions are positioned right behind the upper tank 32, for the fixation to the upper tank 32. The upper fixing portions 71, 71 each have a hole formed respectively therethrough, and the upper fan shroud mounting portions 69, 69 are fixed to the upper tank 32 by inserting clips or the like into these holes. Accordingly, the upper portion of the fan shroud 27 is fixed to the radiator 25.

When the fan shroud 27 is fixed to the radiator 25 via the lower fixing portion 70 and the upper fixing portions 71, 71, the fan shroud body 56 is positioned on the upper side of the radiator core 31 as shown in FIGS. 4 to 7. Accordingly, the fan shroud body 56 covers part of the cooling fins 35 . . . of the radiator 25 in an area where the hood 22 and the cooling fins 35 are vertically aligned and overlapped, and does not cover the cooling fins 35 in an area other than the area described above. In other words, the fan shroud body 56 is arranged so that it exposes a lower portion of the cooling fins 35, in an area where the hood 22 and the cooling fins 35 are not vertically aligned and overlapped.

In other words, the fan shroud 27 is attached to the radiator 25 so as to primarily cover an upper part of the radiator core 31 with the fan shroud body 56 from behind, and is configured to expose the lower portion of the radiator core. More specifically, as apparent from a dividing line L3 which divides the hood 22 and the grill 23 in the vertical direction as shown in FIGS. 4 and 6, the fan shroud 27 is attached in such a manner that the fan shroud body 56 covers the cooling fins 35 of the radiator core 31 in the area where the hood 22 and the radiator core 31 (cooling fins 35) are overlapped with each other in front view, to form an exposed area R which is not covered with the fan shroud body 56 on the cooling fins 35 in the area overlapped with the grill 23.

To be more precise, as shown in FIG. 6, a left side portion of the fan shroud body 56 is offset rightward from a left side portion of the radiator core 31 so as not to cover part of the cooling fins 35 in consideration of exhaust air corresponding to the position of the driver. Here, as shown in FIG. 7, part of the cooling fins 35 of the radiator core 31 are also exposed at the rounded-off corners 63 . . . of the fan shroud body 56, since the corner portions of the radiator core are not covered by the fan shroud body 56.

Referring now to FIGS. 6 and 7, a small air-blocking panel 72, having a rectangular shape and extending in the vehicle width direction, is formed extending between upper end portions of the upper fan shroud mounting portions 69, 69. The air-blocking panel 72 covers a space defined between the back surface of the hood 22 and the upper surface of the upper tank 32 as shown in FIG. 4. Here, the width of the air-blocking panel 72 is set to be larger than the outer diameter of the blades 54 of the fan body 53, in order to prevent a backflow of wind toward the front.

In other words, in FIG. 7, reference sign L1 designates the outer diameter of the blades 54 of the fan body 53 of the cooling fan 26, and reference sign L2 designates the width of the air-blocking panel 72. A relation of L2>L1 is set between these dimensions. Since this dimension setting is for preventing backflow of the wind toward the front after passing through the cooling fan 26, the width of the air-blocking panel 72 is preferably set to a dimension equal to or larger than the outer diameter of the blades 54.

With the cooling system apparatus 24 configured and arranged according to the embodiment described above, the fan shroud body 56 is attached in a state of covering at least part of the cooling fins 35 in the area where the hood 22 and the cooling fins 35 are vertically aligned and overlapped and exposing part of the cooling fins 35. Therefore, traveling winds α, β, and γ introduced from the grill 23 (FIGS. 4-5) pass smoothly through the cooling fins 35 which are not covered with the fan shroud body 56 when the vehicle is traveling.

Also, when the vehicle is traveling at a low speed or stopped, the fan motor 52 of the cooling fan 26 is driven to take up air toward the cooling fins 35 in the area which is vertically aligned and overlapped with the hood 22, so that this area of the cooling fins 35 of the radiator 25 can be cooled intensively. Consequently, even with the vehicle 1 in which the size of the grill 23 cannot be secured sufficiently due to the hood 22, the cooling fins 35 are satisfactorily cooled during times when the vehicle is stopped, as well as during times when the vehicle is traveling.

In other words, the cooling fins 35 are exposed in the area of the radiator core 31 where the traveling wind from the grill 23 hits directly to achieve adequate aeration during movement of the vehicle. In addition, the cooling fins 35 in the area of the radiator core 31 which is vertically aligned and overlapped with the hood 22, where the traveling wind does not hit directly, are cooled by collecting air using the fan shroud 27 and the cooling fan 26. Accordingly, enhancement of cooling efficiency is achieved.

Also, the fan shroud body 56 has the substantially rectangular shape in front view, includes the inner wall surfaces 59A, 60A, 61A, 62A broadening gradually toward the front of the vehicle in a substantially arcuate shape so as to be opened toward the front of the vehicle, and has the corners 63 . . . rounded off and formed into a curved shape, and the cooling fins 35 are exposed partly from the corners 63. Therefore, there is no angular shape which tends to cause air retention in the fan shroud as the air-intake channel, so that a structure which can reduce the air retention in the fan shroud body 56 is achieved.

In addition, since the lower radiator shroud panel 41 and the side radiator shroud panels 44, 45 are provided, the effect of collecting the traveling wind introduced into the radiator 25 is enhanced by the respective radiator shrouds 41, 44, 45.

Moreover, since the air-blocking panel 72 is formed integrally with the fan shroud body 56 for closing a clearance between the upper portion of the radiator 25 and the hood 22, cooling efficiency is enhanced, due to eliminating backflow of air (wind) passed through the radiator 25 to the front of the radiator 25 by the air-blocking panel 72.

Here, since the air-blocking panel 72 is set to have a length equal to or larger than the outer diameter of the blades 54 of the cooling fan 26, lowering of the cooling efficiency is prevented, due to the prevention of backflow of the air (wind) passed through the radiator 25 to the front of the radiator 25.

Also, the fan shroud body 56 is provided with the upper fan shroud mounting portions 69, 69 extending upward so as to straddle the upper tank 32 of the radiator 25 and having the upper fixing portions 71, 71 set thereon as the mounting portion with respect to the radiator 25, and the air-blocking panel 72 is integrally provided with the upper fan shroud mounting portions 69, 69. Therefore, the upper fan shroud mounting portions 69, 69 can be used as supporting members for the hood 22, so that flexing of the hood 22 is substantially prevented from affecting the radiator 25, more specifically, the upper tank 32 (the radiator cap 40, etc.).

The configuration of the embodiment described above is an example of the invention, and various modifications including the composition, the structure, the shape, the size, the number, and the arrangement of the components are possible without departing the scope of the invention.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A cooling system for a vehicle, said cooling system comprising:
   a hood configured to cover a front portion of the vehicle;
   a radiator arranged below the hood;
   an air-intake port arranged below a front portion of the hood and configured to introduce cooling wind into a first portion of the radiator;
   a cooling fan arranged behind the radiator for drawing wind past a second portion of the radiator; and
   a fan shroud extending from an area behind cooling fins of the radiator to an area proximate the cooling fan, said fan shroud defining an air-intake channel for routing wind therethrough,
   wherein a front end of the hood is formed to extend forwardly beyond an upper portion of the radiator in side view, and to be partly vertically aligned with the cooling fins of the radiator,
   wherein the fan shroud covers part of the cooling fins at a portion of the radiator in an area where the hood and the cooling fins are vertically aligned with each other, and exposes another part of the cooling fins at another portion of the radiator; and
   wherein the fan shroud has a substantially rectangular shape in front view, includes an inner wall surface having a substantially arcuate shape broadened gradually toward the front of the vehicle, and is formed to open toward the front of the vehicle.

2. The cooling system according to claim 1, wherein the fan shroud has the cooling fan mounted at a substantially central portion thereof as viewed in side view, and is attached so as to cover an upper portion of the radiator and to expose a lower portion of the radiator.

3. The cooling system according to claim 2, wherein a corner of the substantially rectangular shape of the fan shroud is rounded off such that cooling fins are exposed proximate the rounded off corner of the fan shroud.

4. The cooling system according to claim 1, wherein a corner of the substantially rectangular shape of the fan shroud is rounded off such that selected cooling fins of the radiator are exposed proximate the rounded off corner of the fan shroud.

5. The cooling system according to claim 4, further comprising an air-blocking panel formed integrally with the fan shroud and configured to close a clearance between the upper portion of the radiator and the hood.

6. The cooling system according to claim 5, further comprising a radiator shroud extending forward from both side portions and from a lower portion of the radiator.

7. The cooling system according to claim 1, further comprising an air-blocking panel formed integrally with the fan shroud and configured to close a clearance between the upper portion of the radiator and the hood.

8. The cooling system according to claim 7, further comprising a radiator shroud extending forward from both side portions and from a lower portion of the radiator.

9. The cooling system according to claim 7, wherein the fan shroud is provided with a fan shroud mounting portion extending upwardly thereon for placement abutting a radiator tank of the radiator, and having a mounting fitting thereon to permit attachment of the fan shroud to the radiator, and wherein the air-blocking panel is provided integrally with the fan shroud mounting portion.

10. The cooling system according to claim 7, wherein a length of the air-blocking panel in a vehicle width direction is set to be equal to or larger than an outer diameter of the cooling fan.

11. The cooling system according to claim 1, wherein the cooling fins include an exposed portion which is not covered with the fan shroud in an area which is overlapped with the air-intake port.

12. A cooling system in a vehicle, said cooling system comprising:
    a hood configured to cover a front portion of the vehicle;
    a radiator arranged below the hood;
    an air-intake port arranged below a front portion of the hood and configured to introduce cooling wind into a lower portion of the radiator;
    a cooling fan arranged behind the radiator for drawing wind past an upper portion of the radiator; and
    a fan shroud extending from an area behind cooling fins of the radiator to an area surrounding the cooling fan, said fan shroud defining an air-intake channel for routing wind therethrough,
    wherein a front end of the hood is formed to extend forwardly beyond an upper portion of the radiator in side view, and to be partly vertically aligned with the cooling fins of the radiator,
    wherein the fan shroud covers part of the cooling fins at the upper portion of the radiator in an area where the hood and the cooling fins are vertically aligned with each other, and exposes another part of the cooling fins at the lower portion of the radiator; and
    wherein the fan shroud has a substantially rectangular shape in front view, includes an inner wall surface having a substantially arcuate shape broadened gradually toward the front of the vehicle, and is formed to open toward the front of the vehicle.

13. The cooling system according to claim 12, wherein the fan shroud has the cooling fan mounted at a substantially central portion thereof as viewed in side view.

14. The cooling system according to claim 12, wherein
    a corner of the substantially rectangular shape of the fan shroud is rounded off such that selected cooling fins of the radiator are exposed proximate the rounded off corner of the fan shroud.

15. The cooling system according to claim 12, further comprising an air-blocking panel formed integrally with the fan shroud and configured to close a clearance between the upper portion of the radiator and the hood.

16. The cooling system according to claim 15, further comprising a radiator shroud extending forward from both side portions and from a lower portion of the radiator.

17. The cooling system according to claim 16, wherein a length of the air-blocking panel in a vehicle width direction is set to be equal to or larger than an outer diameter of the cooling fan.

18. The cooling system according to claim 15, wherein the fan shroud is provided with a fan shroud mounting portion extending upwardly thereon for placement abutting a radiator tank of the radiator, and having a mounting fitting thereon to permit attachment of the fan shroud to the radiator, and wherein the air-blocking panel is provided integrally with the fan shroud mounting portion.

19. The cooling system according to claim 15, wherein a length of the air-blocking panel in a vehicle width direction is set to be equal to or larger than an outer diameter of the cooling fan.

20. The cooling system according to claim 12, further comprising a radiator shroud extending forward from both side portions and from a lower portion of the radiator.

* * * * *